(12) United States Patent
Petrovic et al.

(10) Patent No.: US 7,966,291 B1
(45) Date of Patent: Jun. 21, 2011

(54) FACT-BASED OBJECT MERGING

(75) Inventors: Nemanja Petrovic, Plainsboro, NJ (US); David Vespe, New York, NY (US); Alexander Kehlenbeck, New York, NY (US); Farhan Shamsi, Rego Park, NY (US)

(73) Assignee: Google Inc., Mountain View, CA (US)

( * ) Notice: Subject to any disclaimer, the term of this patent is extended or adjusted under 35 U.S.C. 154(b) by 705 days.

(21) Appl. No.: 11/768,877

(22) Filed: Jun. 26, 2007

(51) Int. Cl.
*G06F 17/00* (2006.01)
*G06F 7/00* (2006.01)
*G09G 5/00* (2006.01)

(52) U.S. Cl. ......... 707/641; 707/808; 345/629; 345/636

(58) Field of Classification Search ........... 707/7, 999.2, 707/999.002, 999.003, 641, 808; 709/224; 717/125, 131, 107; 345/629, 636
See application file for complete search history.

(56) References Cited

U.S. PATENT DOCUMENTS

| | | | |
|---|---|---|---|
| 5,010,478 A | 4/1991 | Deran | 364/200 |
| 5,133,075 A | 7/1992 | Risch | 395/800 |
| 5,347,653 A | 9/1994 | Flynn et al. | 395/600 |
| 5,440,730 A | 8/1995 | Elmasri et al. | 395/600 |
| 5,475,819 A | 12/1995 | Miller et al. | 395/200.03 |
| 5,519,608 A | 5/1996 | Kupiec | 364/419.08 |
| 5,560,005 A | 9/1996 | Hoover et al. | 395/600 |
| 5,574,898 A | 11/1996 | Leblang et al. | 395/601 |
| 5,680,622 A | 10/1997 | Even | 395/709 |
| 5,694,590 A | 12/1997 | Thuraisingham et al. | 395/600 |
| 5,701,470 A | 12/1997 | Joy et al. | 395/614 |
| 5,717,911 A | 2/1998 | Madrid et al. | 395/602 |
| 5,717,951 A | 2/1998 | Yabumoto | 395/831 |
| 5,778,378 A | 7/1998 | Rubin | 707/103 |
| 5,787,413 A | 7/1998 | Kauffman et al. | 707/2 |
| 5,793,966 A | 8/1998 | Amstein et al. | 395/200.33 |
| 5,802,299 A | 9/1998 | Logan et al. | 395/200.48 |
| 5,815,415 A | 9/1998 | Bentley et al. | 364/578 |

(Continued)

FOREIGN PATENT DOCUMENTS

JP 5-174020 A 7/1993

(Continued)

OTHER PUBLICATIONS

Agichtein, *Snowball: Extracting Relations from Large Plain-Text Collections*, Columbia University Computer Science Dept. Technical Report CUCS-033-99, Dec. 1999, pp. 1-13.

(Continued)

*Primary Examiner* — Mohammad Ali
*Assistant Examiner* — Bao G Tran
(74) *Attorney, Agent, or Firm* — Morgan, Lewis & Bockius LLP

(57) ABSTRACT

A repository contains objects including facts about entities. Some objects might be associated with the same entity. An object merge engine identifies a set of merge candidate objects. A grouping module groups the merge candidate objects based on the values of facts included in the objects. An object comparison module compares pairs of objects in each group to identify evidence for and/or against merging the pair. Evidence for merging the pair exists if, e.g., the objects have a type in common or share an uncommon fact. Evidence against merging the pair exists if, e.g., the objects have differing singleton attributes. A graph generation module generates graphs describing the evidence for and/or against merging the pair. A merging module analyzes the graphs and merges objects associated with the same entity. The merged objects are stored in the repository.

30 Claims, 9 Drawing Sheets

U.S. PATENT DOCUMENTS

| | | | |
|---|---|---|---|
| 5,819,210 A | 10/1998 | Maxwell, III et al. | 704/9 |
| 5,819,265 A | 10/1998 | Ravin et al. | 707/5 |
| 5,822,743 A | 10/1998 | Gupta et al. | 706/50 |
| 5,826,258 A | 10/1998 | Gupta et al. | 707/4 |
| 5,909,689 A | 6/1999 | Van Ryzin | 707/203 |
| 5,920,859 A | 7/1999 | Li | 707/5 |
| 5,943,670 A | 8/1999 | Prager | 707/5 |
| 5,956,718 A | 9/1999 | Prasad et al. | 707/10 |
| 5,974,254 A | 10/1999 | Hsu | 395/703 |
| 5,987,460 A | 11/1999 | Niwa et al. | 707/6 |
| 6,018,741 A | 1/2000 | Howland et al. | 707/102 |
| 6,044,366 A | 3/2000 | Graffe et al. | 707/2 |
| 6,052,693 A | 4/2000 | Smith et al. | 707/104 |
| 6,078,918 A | 6/2000 | Allen et al. | 707/6 |
| 6,112,203 A | 8/2000 | Bharat et al. | 707/5 |
| 6,112,210 A | 8/2000 | Nori et al. | 707/103 |
| 6,122,647 A | 9/2000 | Horowitz et al. | 707/513 |
| 6,134,555 A | 10/2000 | Chadha et al. | 707/102 |
| 6,138,270 A * | 10/2000 | Hsu | 717/125 |
| 6,212,526 B1 | 4/2001 | Chaudhuri et al. | 707/102 |
| 6,240,546 B1 | 5/2001 | Lee et al. | 717/4 |
| 6,263,328 B1 | 7/2001 | Coden et al. | 707/3 |
| 6,285,999 B1 | 9/2001 | Page | 707/5 |
| 6,289,338 B1 | 9/2001 | Stoffel et al. | 707/3 |
| 6,311,194 B1 | 10/2001 | Sheth et al. | 707/505 |
| 6,327,574 B1 | 12/2001 | Kramer et al. | 705/14 |
| 6,349,275 B1 | 2/2002 | Schumacher et al. | 704/8 |
| 6,377,943 B1 | 4/2002 | Jakobsson | 707/2 |
| 6,397,228 B1 | 5/2002 | Lamburt et al. | 707/203 |
| 6,473,898 B1 | 10/2002 | Waugh et al. | 717/168 |
| 6,502,102 B1 | 12/2002 | Haswell et al. | 707/102 |
| 6,556,991 B1 | 4/2003 | Borkovsky | 707/6 |
| 6,567,936 B1 | 5/2003 | Yang et al. | 714/37 |
| 6,572,661 B1 | 6/2003 | Stern | 715/501.1 |
| 6,584,464 B1 | 6/2003 | Warthen | 707/4 |
| 6,606,625 B1 | 8/2003 | Muslea et al. | 707/6 |
| 6,606,659 B1 | 8/2003 | Hegli et al. | 709/225 |
| 6,609,123 B1 | 8/2003 | Cazemier et al. | 707/4 |
| 6,656,991 B2 | 12/2003 | Staccione et al. | 524/430 |
| 6,665,659 B1 | 12/2003 | Logan | 707/3 |
| 6,665,666 B1 | 12/2003 | Brown et al. | 707/5 |
| 6,665,837 B1 | 12/2003 | Dean et al. | 715/501.1 |
| 6,745,189 B2 | 6/2004 | Schreiber | 707/10 |
| 6,754,873 B1 | 6/2004 | Law et al. | 715/501.1 |
| 6,799,176 B1 | 9/2004 | Page | 707/5 |
| 6,804,667 B1 | 10/2004 | Martin | 707/6 |
| 6,820,081 B1 * | 11/2004 | Kawai et al. | 707/7 |
| 6,823,495 B1 | 11/2004 | Vedula et al. | 715/805 |
| 6,850,896 B1 | 2/2005 | Kelman et al. | 705/10 |
| 6,886,005 B2 | 4/2005 | Davis | 707/2 |
| 6,901,403 B1 | 5/2005 | Bata et al. | 707/101 |
| 6,957,213 B1 | 10/2005 | Yuret | 707/4 |
| 6,963,880 B1 | 11/2005 | Pingte et al. | 707/103 R |
| 7,003,522 A1 | 2/2006 | Reynar et al. | 707/10 |
| 7,003,719 B1 | 2/2006 | Rosenoff et al. | 715/500.1 |
| 7,020,662 B2 | 3/2006 | Boreham et al. | 707/104.1 |
| 7,051,023 B2 | 5/2006 | Kapur et al. | 707/5 |
| 7,080,073 B1 | 7/2006 | Jiang et al. | 707/7 |
| 7,080,085 B1 | 7/2006 | Choy et al. | 707/101 |
| 7,143,099 B2 | 11/2006 | Lecheler-Moore et al. | 707/101 |
| 7,146,536 B2 | 12/2006 | Bingham, Jr. et al. | 714/26 |
| 7,162,499 B2 | 1/2007 | Lees et al. | 707/203 |
| 7,194,380 B2 | 3/2007 | Barrow et al. | 702/19 |
| 7,197,449 B2 | 3/2007 | Hu et al. | 704/9 |
| 7,277,879 B2 | 10/2007 | Varadarajan | 707/1 |
| 7,305,380 B1 | 12/2007 | Hoelzle et al. | 707/3 |
| 7,363,312 B2 | 4/2008 | Goldsack | 707/102 |
| 7,472,182 B1 * | 12/2008 | Young et al. | 709/224 |
| 7,483,829 B2 | 1/2009 | Murakami et al. | 704/10 |
| 7,493,317 B2 | 2/2009 | Geva | 707/3 |
| 7,797,282 B1 | 9/2010 | Kirshenbaum et al. | 707/651 |
| 2002/0038307 A1 | 3/2002 | Obradovic et al. | 707/102 |
| 2002/0042707 A1 | 4/2002 | Zhao et al. | 704/9 |
| 2002/0065845 A1 | 5/2002 | Naito et al. | 707/500.1 |
| 2002/0073115 A1 | 6/2002 | Davis | 707/500.1 |
| 2002/0083039 A1 | 6/2002 | Ferrari et al. | 707/1 |
| 2002/0087567 A1 | 7/2002 | Spiegler et al. | 707/100 |
| 2002/0147738 A1 | 10/2002 | Reader | 707/500 |
| 2002/0169770 A1 | 11/2002 | Kim et al. | 707/5 |
| 2002/0178448 A1 | 11/2002 | Te Kiefte et al. | 725/46 |
| 2002/0194172 A1 | 12/2002 | Schreiber | 707/4 |
| 2003/0018652 A1 | 1/2003 | Heckerman et al. | 707/104.1 |
| 2003/0058706 A1 | 3/2003 | Okamoto et al. | 365/200 |
| 2003/0078902 A1 | 4/2003 | Leong et al. | 706/59 |
| 2003/0120644 A1 * | 6/2003 | Shirota | 707/3 |
| 2003/0120675 A1 | 6/2003 | Stauber et al. | 707/100 |
| 2003/0126102 A1 | 7/2003 | Borthwick | 706/21 |
| 2003/0149567 A1 | 8/2003 | Schmitz et al. | 704/270 |
| 2003/0154071 A1 | 8/2003 | Shreve | 704/9 |
| 2003/0177110 A1 | 9/2003 | Okamoto et al. | 707/3 |
| 2003/0182310 A1 | 9/2003 | Charnock et al. | 707/104.1 |
| 2003/0195877 A1 | 10/2003 | Ford et al. | 707/3 |
| 2003/0196052 A1 | 10/2003 | Bolik et al. | 711/162 |
| 2004/0003067 A1 | 1/2004 | Ferrin | 709/223 |
| 2004/0024739 A1 | 2/2004 | Copperman et al. | 707/1 |
| 2004/0064447 A1 | 4/2004 | Simske et al. | 707/5 |
| 2004/0088292 A1 | 5/2004 | Dettinger et al. | 707/4 |
| 2004/0107125 A1 | 6/2004 | Guheen et al. | 705/7 |
| 2004/0122844 A1 | 6/2004 | Malloy et al. | 707/102 |
| 2004/0123240 A1 | 6/2004 | Gerstl et al. | 715/513 |
| 2004/0128624 A1 | 7/2004 | Arellano et al. | 715/530 |
| 2004/0143600 A1 | 7/2004 | Musgrove et al. | 707/104.1 |
| 2004/0153456 A1 | 8/2004 | Charnock et al. | 707/10 |
| 2004/0167870 A1 | 8/2004 | Wakefield et al. | 707/1 |
| 2004/0177015 A1 | 9/2004 | Galai et al. | 705/35 |
| 2004/0199923 A1 | 10/2004 | Russek | 719/310 |
| 2004/0240542 A1 * | 12/2004 | Yeredor et al. | 375/240.01 |
| 2004/0255237 A1 | 12/2004 | Tong | 715/501.1 |
| 2004/0260979 A1 | 12/2004 | Kumai | 714/37 |
| 2004/0267700 A1 * | 12/2004 | Dumais et al. | 707/2 |
| 2005/0076012 A1 | 4/2005 | Manber et al. | 707/3 |
| 2005/0086211 A1 | 4/2005 | Mayer | 707/3 |
| 2005/0086222 A1 | 4/2005 | Wang et al. | 707/5 |
| 2005/0097150 A1 | 5/2005 | McKeon et al. | 707/202 |
| 2005/0125311 A1 | 6/2005 | Chidiac et al. | 705/28 |
| 2005/0149576 A1 | 7/2005 | Marmaros et al. | 707/200 |
| 2005/0149851 A1 | 7/2005 | Mittal | 715/501.1 |
| 2005/0187923 A1 | 8/2005 | Cipollone | 707/3 |
| 2005/0240615 A1 | 10/2005 | Barsness et al. | 707/102 |
| 2005/0256825 A1 | 11/2005 | Dettinger et al. | 707/1 |
| 2006/0026122 A1 * | 2/2006 | Hurwood et al. | 707/1 |
| 2006/0036504 A1 | 2/2006 | Allocca et al. | 705/26 |
| 2006/0041597 A1 * | 2/2006 | Conrad et al. | 707/200 |
| 2006/0047838 A1 | 3/2006 | Chauhan | 709/230 |
| 2006/0053171 A1 | 3/2006 | Eldridge et al. | 707/203 |
| 2006/0053175 A1 | 3/2006 | Gardner et al. | 707/203 |
| 2006/0074824 A1 | 4/2006 | Li | 706/20 |
| 2006/0074910 A1 | 4/2006 | Yun et al. | 707/7 |
| 2006/0085465 A1 | 4/2006 | Nori et al. | 707/101 |
| 2006/0136585 A1 * | 6/2006 | Mayfield et al. | 709/224 |
| 2006/0143227 A1 | 6/2006 | Helm et al. | 707/103 |
| 2006/0143603 A1 | 6/2006 | Kalthoff et al. | 717/172 |
| 2006/0152755 A1 | 7/2006 | Curtis et al. | 358/1.15 |
| 2006/0238919 A1 | 10/2006 | Bradley | 360/128 |
| 2006/0248045 A1 | 11/2006 | Toledano et al. | 707/2 |
| 2006/0248456 A1 | 11/2006 | Bender et al. | 715/531 |
| 2006/0253418 A1 | 11/2006 | Charnock et al. | 707/1 |
| 2006/0288268 A1 | 12/2006 | Srinivasan et al. | 715/505 |
| 2006/0293879 A1 | 12/2006 | Zhao et al. | 704/9 |
| 2007/0005593 A1 | 1/2007 | Self et al. | 707/6 |
| 2007/0005639 A1 | 1/2007 | Gaussier et al. | 707/103 R |
| 2007/0016890 A1 | 1/2007 | Brunner et al. | 717/107 |
| 2007/0038610 A1 | 2/2007 | Omoigui | 707/3 |
| 2007/0073768 A1 | 3/2007 | Goradia | 707/104.1 |
| 2007/0094246 A1 | 4/2007 | Dill et al. | 707/4 |
| 2007/0130123 A1 | 6/2007 | Majumder | 707/3 |
| 2007/0143317 A1 | 6/2007 | Hogue et al. | 707/100 |
| 2007/0150800 A1 | 6/2007 | Betz et al. | 715/500 |
| 2007/0198480 A1 | 8/2007 | Hogue et al. | 707/3 |
| 2007/0198481 A1 * | 8/2007 | Hogue et al. | 707/3 |
| 2007/0203867 A1 | 8/2007 | Hogue et al. | 706/48 |
| 2007/0271268 A1 | 11/2007 | Fontoura et al. | 707/6 |
| 2008/0071739 A1 | 3/2008 | Kumar et al. | 707/3 |
| 2008/0127211 A1 * | 5/2008 | Belsey et al. | 719/315 |
| 2009/0006359 A1 | 1/2009 | Liao | 707/5 |

FOREIGN PATENT DOCUMENTS

| WO | WO 01/27713 A2 | 4/2001 |
|---|---|---|
| WO | WO 2004/114163 A2 | 12/2004 |
| WO | WO 2006/104951 A1 | 10/2006 |

OTHER PUBLICATIONS

Andritsos, *Information-Theoretic Tools for Mining Database Structure from Large Data Sets*, ACM SIGMOD 2004, Jun. 13-18, 2004, 12 pages.
Brill, *An Analysis of the AskMSR Question-Answering System*, Proceedings of the Conference of Empirical Methods in Natural Language Processing (EMNLP), Jul. 2002, pp. 257-264.
Brin, *Extracting Patterns and Relations from the World Wide Web*, Computer Science Department, Stanford University, 1999, 12 pages.
Brin, *The Anatomy of a Large-Scale Hypertextual Web Search Engine*, 7th International World Wide Web Conference, Brisbane, Australia, Apr. 14-18, 1998, pp. 1-26.
Bunescu, *Using Encyclopedic Knowledge for Named Entity Disambiguation*, Department of Computer Sciences, University of Texas at Austin, retrieved from internet Dec. 28, 2006, 8 pages.
Chang, *IEPAD: Information Extraction Based on Pattern Discovery*, WWW10 '01, ACM, Hong Kong, May 1-5, 2001, pp. 681-688.
Chen, *A Scheme for Inference Problems Using Rough Sets and Entropy*, Department of Computer Science, Lakehead University, Thunder Bay, ON, Canada, Springer-Verlag Berlin Heidelberg, 2005, pp. 558-567.
Chu-Carroll, *A Multi-Strategy with Multi-Source Approach to Question Answering*, IBM T.J. Watson Research Center, Yorktown Heights, NY, 2006, 8 pages.
Cover, *Entropy, Relative Entropy and Mutual Information*, Chapter 2 of Elements of Information Theory, Wiley-InterScience, New York, NY, 1991, pp. 12-23.
Craswell, *Effective Site Finding using Link Anchor Information*, SIGIR '01, New Orleans, LA, Sep. 9-12, 2001, pp. 250-257.
Dean, *MapReduce: Simplified Data Processing on Large Clusters*, OSDI, 2004, pp. 1-13.
Dong, *Reference Reconciliation in Complex Information Spaces*, SIGACM-SIGMOD, Baltimore, MD, 2005, 12 pages.
Downey, *Learning Text Patterns for Web Information Extraction and Assessment*, American Association for Artificial Intelligence, 2002, 6 pages.
Etzioni, *Web-scale Information Extraction in KnowItAll (Preliminary Results)*, WWW2004, ACM, New York, NY, May 17-20, 2004, 11 pages.
Freitag, *Boosted Wrapper Induction*, American Association for Artificial Intelligence, 2000, 7 pages.
Gao, *Learning Information Extraction Patterns from Tabular Web Pages Without Manual Labelling*, Proceedings of IEEE/WIC Int'l Conf. on Web Intelligence (WI'03), Oct. 13-17, 2003, pp. 495-498.
Gray, *Entropy and Information*, Chapter 2 of Entropy and Information Theory, Springer-Verlag, New York, NY, 1990, pp. 17-46.
Guha, *Disambiguating People in Search*, WWW2004, New York, NY, May 17-22, 2004, 9 pages.
Guha, *Object Co-Identification on the Semantic Web*, WWW2004, ACM, New York, NY, May 17-22, 2004, 9 pages.
Haveliwala, *Topic-Sensitive PageRank*, WWW2002, Honolulu, HI, May 7-11, 2002, pp. 1-23.
Hogue, *Tree Pattern Inference and Matching for Wrapper Induction on the World Wide Web*, Master of Engineering in Electrical Engineering and Computer Science, Massachusetts Institute of Technology, Jun. 2004, pp. 1-106.
Information Entropy—Wikipedia, the free encyclopedia, retrieved on May 3, 2006, pp. 1-9.
Information Theory—Wikipedia, the free encyclopedia, retrieved on May 3, 2006, pp. 1-12.
International Search Report and Written Opinion, PCT/US06/07639, Sep. 13, 2006, 5 pages.
International Search Report and Written Opinion, PCT/US07/61156, Feb. 11, 2008, 7 pages.
International Search Report and Written Opinion, PCT/US2006/019807, Dec. 18, 2006, 10 pages.
Jeh, *Scaling Personalized Web Search*, WWW2003, Budapest, Hungary, May 20-24, 2003, pp. 1-24.
Ji, *Re-Ranking Algorithms for Name Tagging*, Workshop on Computationally Hard Problems and Joint Inference in Speech and Language Processing, New York University, NY, Jun. 2006, 8 pages.
Jones, *Bootstrapping for Text Learning Tasks*, Carnegie Mellon University, Pittsburgh, PA, 1999, 12 pages.
Koeller, *Approximate Matching of Textual Domain Attributes for Information Source Integration*, IQIS2005, Baltimore, MD, Jun. 17, 2005, pp. 77-86.
Kolodner, *Indexing and Retrieval Strategies for Natural Language Fact Retrieval*, ACM Transactions on Database Systems, vol. 8, No. 3, Sep. 1983, pp. 434-464.
Kosseim, *Answer Formulation for Question-Answering*, Concordia University, Montreal, Quebec, Canada, Oct. 1, 2007, 11 pages.
Liu, *Mining Data Records in Web Pages*, Conference '00, ACM 2000, pp. 1-10.
MacKay, *Probability, Entropy, and Inference*, Chapter 2 of Information Theory, Inference, and Learning Algorithms, Cambridge University Press 2003, Version 7.2, Mar. 28, 2005, pp. 22-33 and 138-140.
Mann, *Unsupervised Personal Name Disambiguation*, Department of Computer Science, Johns Hopkins University, Baltimore, MD, Proceedings of the Seventy Conference on Natural Language Learning at HLT-NAACL, 2003, 8 pages.
McCallum, *Object Consolidation by Graph Partitioning with a Conditionally-Trained Distance Metric*, SIGKDD 03, Washington, DC, Aug. 24-27, 2003, 6 pages.
Merriam Webster Dictionary defines "normalize" as "to make conform to or reduce to a norm or standard", 1865, 2 pages.
Merriam Webster Dictionary defines "value" as "a numerical quantity that is assigned or is determined by calculation or measurement", 1300, 2 pages.
Microsoft Computer Dictionary defines "normalize" as "adjust number within specific range", May 1, 2002, 4 pages.
Microsoft Computer Dictionary Defines "quantity" as a "number", May 1, 2002, 4 pages.
Microsoft Computer Dictionary defines "value" as "a quantity", May 1, 2002, 4 pages.
Mihalcea, *PageRank on Semantic Networks, with Application to Word Sense Disambiguation*, Proceedings of the 20th International Conference on Computational Linguistics, Aug. 23-27, 2004, 7 pages.
Mihalcea, *TextRank: Bringing Order into Texts*, Proceedings of the Conference on Empirical Methods in Natural Language Processing, Jul. 2004, 8 pages.
Page, *The PageRank Citation Ranking: Bringing Order to the Web*, Stanford Digital Libraries Working Paper, 1998, pp. 1-17.
Pawson, *Sorting and Grouping*, www.dpawson.co.uk/xsl/sect2/N6280.html, Feb. 7, 2004, pp. 1-19.
Prager, *IBM's Piquant in TREC2003*, 2003, 10 pages.
Prager, *Question Answering Using Constraint Satisfaction: QA-by Dossier with Constraints*, 2004, 8 pages.
Ramakrishnan, *Is Question Answering an Acquired Skill?*, WWW2004, New York, NY, May 17, 2004, pp. 111-120.
Richardson, *Beyond Page Rank: Machine Learning for Static Ranking*, WWW2006, Edinburgh, Scotland, May 23-26, 20069 pages.
Richardson, *The Intelligent Surfer: Probabilistic Combination of Link and Content Information in PageRank*, Advances in Neural Information Processing Systems, vol. 14, MIT Press, Cambridge, MA, 2002, 8 pages.
Riloff, *Learning Dictionaries for Information Extraction by Multi-Level Bootstrapping*, AAAI-99, 1999, 6 pages.
Shannon, *A Mathematical Theory of Communication*, The Bell System Technical Journal, vol. 27, Jul.-Oct. 1948, pp. 1-55.
Sun Microsystems, *Attribute Names*, http://java.sun.com/products/jndi/tutorial/basics/directory/attrnames.html, Feb. 17, 2004, 2 pages.
Wang, *C4-2: Combining Link and Contents in Clustering Web Search Results to Improve Information Interpretation*, The University of Tokyo, Tokyo, Japan, 2002, pp. 1-9.
Wirzenius, *C Preprocessor Trick for Implementing Similar Data Types*, Jan. 17, 2000, 9 pages.

\* cited by examiner

| Object ID=1 | Fact ID=10 |
| Object ID=1 | Fact ID=20 |
| Object ID=1 | Fact ID=30 |
| Object ID=2 | Fact ID=40 |

FIG. 2(c)

FACT-BASED OBJECT MERGING

TECHNICAL FIELD

The disclosed embodiments relate generally to fact repositories. More particularly, the disclosed embodiments relate to determining whether different objects in a repository are associated with the same entity.

BACKGROUND

When data are gathered from diverse sources, it is often difficult to determine whether data from different sources pertain to the same entity. For example, consider the problem of extracting data from web pages and other electronic documents on the Internet in order to build a repository of objects containing facts about entities. Generally, it is possible to analyze a web page and identify the name of the entity that the page describes. For example, one can determine that a web page describes the entity named "George Bush." Therefore, one technique for building the fact repository is to create an object for each (name, web page) tuple and associate all of the facts on the given web page with that object.

Since the technique described above treats each object formed from a (name, web page) tuple as unique, it can result in many different objects associated with the same entity. There might be 7,000,000 web pages references for "George Bush," 5,000,000 references for "Bill Clinton," and an additional 500,000 references for "William Jefferson Clinton," and each web page results in a separate object. However, some objects with the same name might be associated with different entities. For example, two objects named "George Bush" can be associated with different entities if one object references the $41^{st}$ President of the United States while the other references the $43^{th}$ President. Likewise, two objects named "Bill Clinton" can be associated with different entities if one object describes the $42^{nd}$ President while the other describes a book about the Clinton presidency. Two objects with different names might also describe the same entity. Additional complications arise because even objects about the same entity are likely to contain different subsets of facts about the entity, and objects will sometimes contain erroneous facts due to errors in the source documents.

Ideally, the fact repository should contain exactly one extracted object for each unique entity. However, the large number of web pages and resulting extracted objects makes it impractical for human users to review and analyze the objects in the repository

SUMMARY

The above and other needs are met by methods, systems, and computer program products that merge objects associated with the same entity. Embodiments of the method comprise identifying a plurality of merge candidate objects, each merge candidate object including one or more facts describing an entity with which the object is associated and having at least one fact with a same attribute, and grouping the plurality of merge candidate objects responsive to the values of the fact having the same attribute. The method further identifies similarities between objects in each group and generates one or more graphs describing the identified similarities among the objects of all of the groups. The method analyzes the one or more graphs describing the similarities among the objects to identify two or more objects associated with the same entity. The method also merges the two or more objects associated with the same entity to produce a merged object and stores the merged object in a repository.

Embodiments of the system and computer program product comprise a grouping module for identifying a plurality of merge candidate objects, each merge candidate object including one or more facts describing an entity with which the object is associated and at least one fact with a same attribute. The grouping module also groups the plurality of merge candidate objects responsive to values of the fact having the same attribute. The system and computer program product further comprise an object comparison module for identifying similarities between objects in each group and a graph generation module for generating one or more graphs describing identified similarities among the objects of all of the groups. Finally, a merging module analyzes the one or more graphs describing the similarities among the objects to identify two or more objects associated with the same entity, merges the two or more objects associated with the same entity to produce a merged object, and stores the merged object in a repository.

BRIEF DESCRIPTION OF THE DRAWINGS

FIGS. 2(a)-2(d) are block diagrams illustrating a data structure for facts within a repository of FIG. 1 in accordance with some embodiments.

DESCRIPTION OF EMBODIMENTS

Embodiments are now described with reference to the figures where like reference numbers indicate identical or functionally similar elements.

Figure 1:
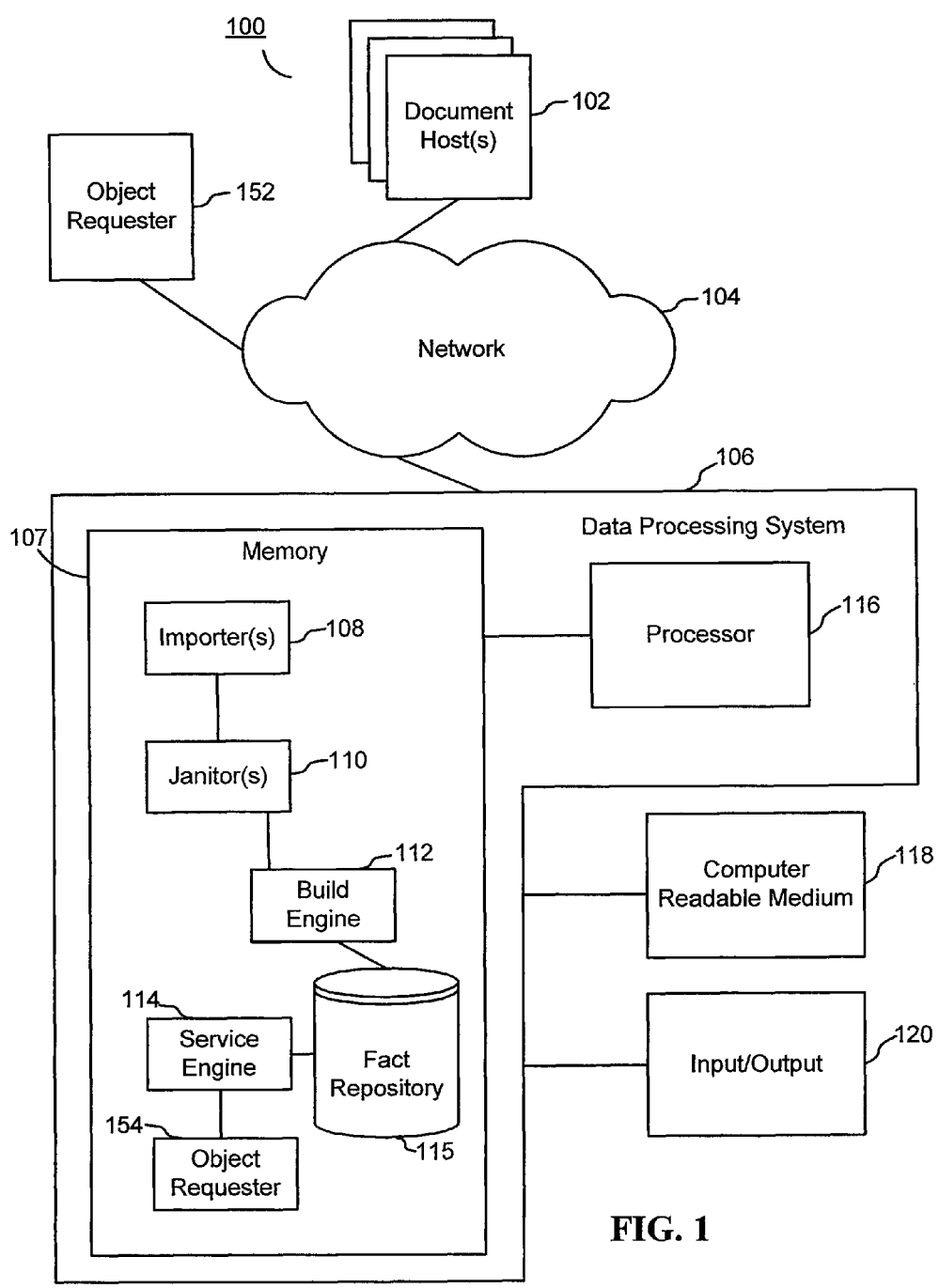
FIG. 1 shows a system architecture adapted to support one embodiment.

FIG. 1 shows a system architecture 100 adapted to support one embodiment. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in an interpreted language (e.g., JavaScript) or in any other computer readable or executable format. A document can include one or more hyperlinks to other documents. A typical document will include one or more facts within its content. The facts describe entities, such as a real-world or fictional people, places, or things.

A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, JAVA®). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. The data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by the processor 116. Importers 108 operate to process documents received from the document hosts, read the data content of documents, and extract facts (as operationally and programmatically defined within the data processing system 106) from such documents. The importers 108 also determine the subject or subjects (i.e., the entity or entities) with which the facts are associated, and extract such facts into individual items of data, for storage in the repository 115. In one embodiment, there are different types of importers 108 for different types of documents, for example, dependent on the format or document type.

Janitors 110 operate to process facts extracted by the importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from the repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "Dec. 2, 1981" while on another page that her date of birth is "Dec. 2, 1981." Birthday and Date of Birth might both be rewritten as "Birthdate" by one janitor and then another janitor might notice that Dec. 2, 1981 and Dec. 2, 1981 are different forms of the same date. It would choose the preferred form, remove the other fact and combine the source lists for the two facts. As a result, one source page for this fact will contain an exact match of the fact while another source page will contain text that is considered synonymous with the fact.

The build engine 112 builds and manages the repository 115. The service engine 114 is an interface for querying the repository 115. The service engine 114's main function is to process queries, score matching objects, and return them to the caller but it is also used by the janitor 110.

The repository 115 stores factual information about entities. The information is extracted from a plurality of documents that are located on document hosts 102. A document from which a particular fact may be extracted is a source document (or "source") of that particular fact. In other words, a source of a fact includes that fact (or a synonymous fact) within its contents.

The repository 115 contains one or more facts. In one embodiment, the facts are logically organized into "objects," and each object contains a collection of facts associated with a single entity (i.e., real-world or fictional person, place, or thing). Each fact is associated with exactly one object. One implementation for this association includes in each fact an object ID that uniquely identifies the associated object. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in the repository 115 are described below, in relation to FIGS. 2(*a*)-2(*d*).

Some embodiments operate on the facts and/or objects in different orders than described above. For example, in one embodiment the importer 108 provides facts directly to the build engine 112 and/or repository 115. The janitors 110, in turn, operate on the facts and/or objects in the repository 115. It should also be appreciated that in practice at least some of the components of the data processing system 106 will be distributed over multiple computers, communicating over a network. For example, the repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on the data processing system 106 instead of being coupled to the data processing system 106 by a network. For example, the importer 108 may import facts from a database that is a part of or associated with the data processing system 106.

FIG. 1 also includes components to access the repository 115 on behalf of one or more object requesters 152, 154. Object requesters are entities that request objects from the repository 115. Object requesters 152, 154 may be understood as clients of the system 106, and can be implemented in any computer device or architecture. As shown in FIG. 1, a first object requester 152 is located remotely from system 106, while a second object requester 154 is located in the data processing system 106. For example, in a computer system hosting a blog, the blog may include a reference to an object whose facts are in the repository 115. An object requester 152, such as a browser displaying the blog, will access data processing system 106 so that the information of the facts associated with the object can be displayed as part of the blog web page. As a second example, a janitor 110 or other entity considered to be part of data processing system 106 can function as an object requester 154, requesting the facts of objects from the repository 115.

FIG. 1 shows that the data processing system 106 includes a memory 107 and one or more processors 116. The memory 107 includes the importers 108, janitors 110, build engine 112, service engine 114, and requester 154, each of which is preferably implemented as instructions stored in memory 107 and executable by processor 116. Memory 107 also includes the repository 115. The repository 115 can be stored in a memory of one or more computer systems or in a type of memory such as a disk. FIG. 1 also includes a computer readable storage medium 118 containing, for example, at least one of importers 108, janitors 110, the build engine 112, the service engine 114, the requester 154, and at least some portions of the repository 115. FIG. 1 also includes one or more input/output devices 120 that allow data to be input and output to and from the data processing system 106. It will be understood that embodiments of the data processing system 106 also include standard software components such as operating systems and the like and further include standard hardware components not shown in the figure for clarity of example.

Figure 2A:
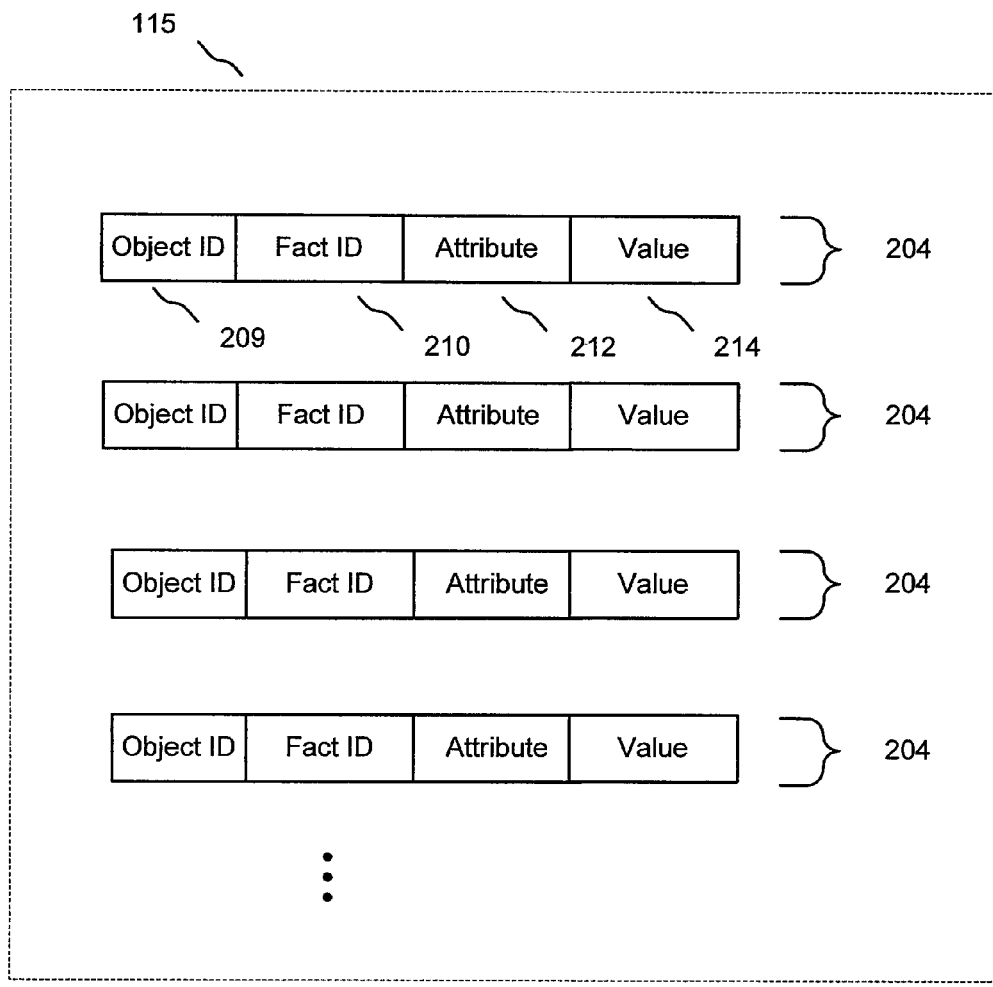

FIG. 2(a) shows an example format of a data structure for facts within the repository 115, according to some embodiments. As described above, the repository 115 includes facts 204 describing entities such as real-world and fictional people, places, and things. Each fact 204 includes a unique identifier for that fact, such as a fact ID 210. Each fact 204 includes at least an attribute 212 and a value 214. For example, a fact associated with the entity George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object with which the fact is associated. Thus, each fact that describes the same entity (such as George Washington), will have the same object ID 209. In one embodiment, the objects are logical concepts that exist as a collection of facts having the same object ID. In another embodiment, objects are stored as units of data in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
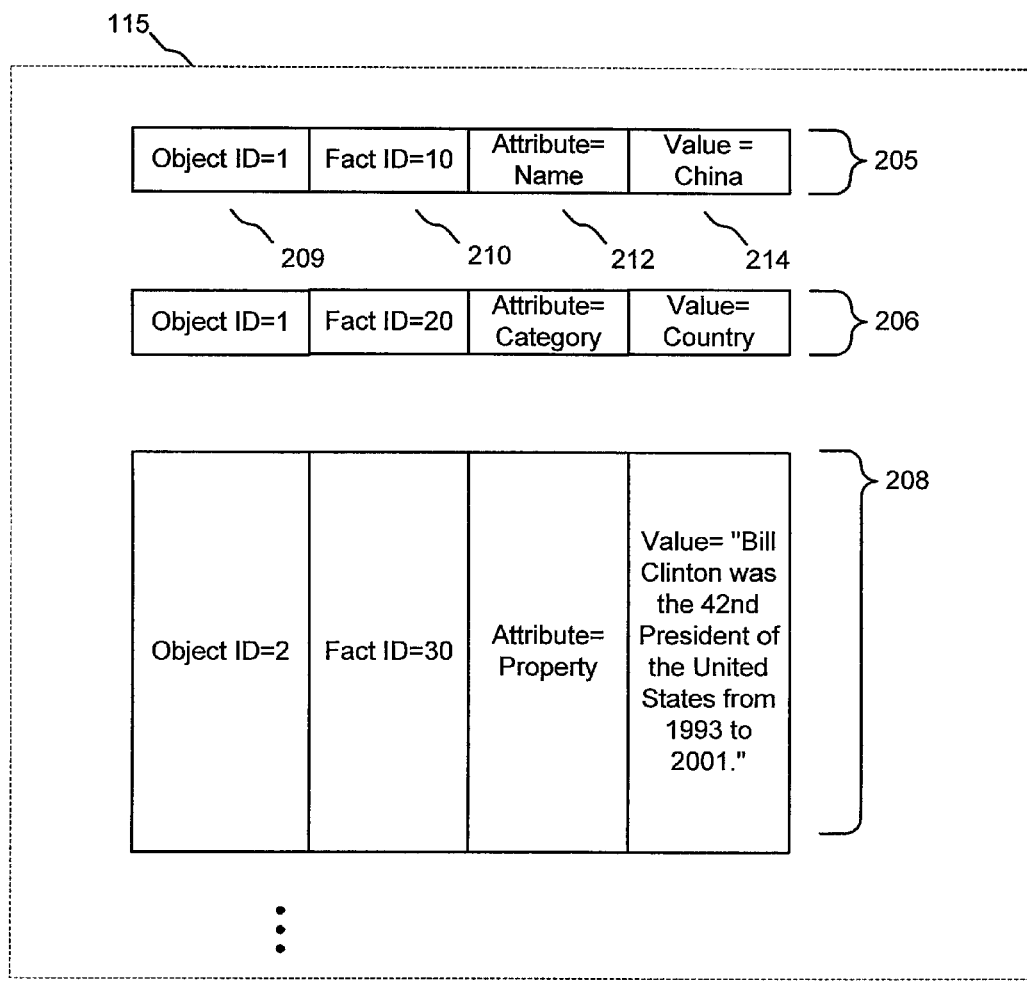

FIG. 2(b) shows an example of facts having respective fact IDs of 10, 20, and 30 in the repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, and perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository 115 to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
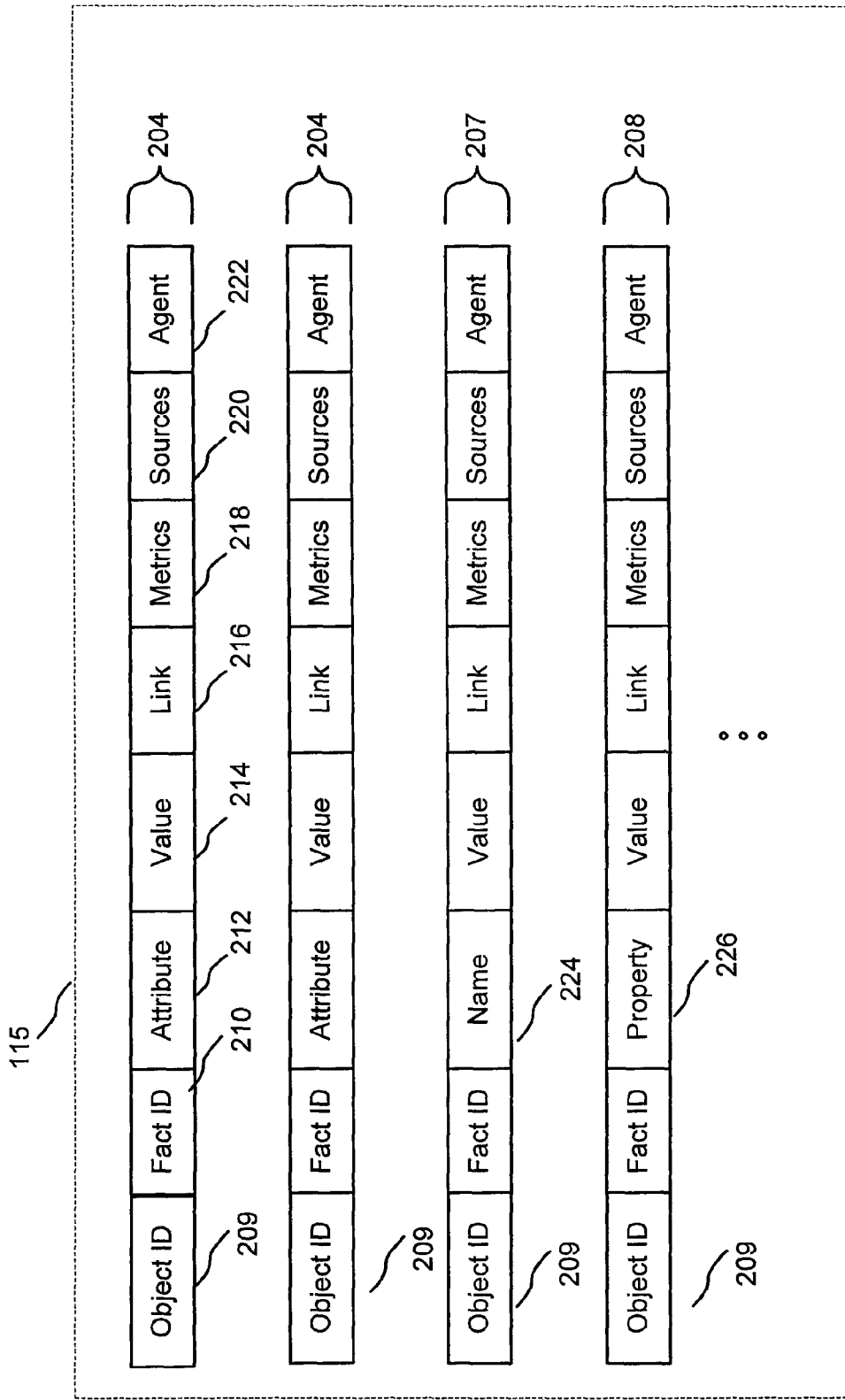

FIG. 2(d) shows an example of a data structure for facts within the repository 115, according to some embodiments, showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object associated with the entity "United States," there may be a fact with the attribute of "president" and the value of "George W. Bush," with "George W. Bush" being an object having its own facts in the repository 115. In some embodiments, the value field 214 stores the name of the linked object and the link 216 stores the object identifier of the linked object. Thus, this "president" fact would include the value 214 of "George W. Bush", and an object reference link 216 that contains the object ID for the "George W. Bush" object. In some other embodiments, facts 204 do not include a link field 216 because the value 214 of a fact 204 may store a link to another object.

Each fact 204 also may include one or more metrics 218. A metric provides an indication of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity associated with the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity associated with the object in which the fact is included. A name fact 207 includes an attribute 224 of "name" and a value, which is the name of the associated entity. For example, for an object associated with country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object may have one or more associated name facts, as many entities can have more than one name. For example, an object associated with Spain may have associated name facts conveying the country's common name "Spain" and the official name "Kingdom of Spain." As another example, an object associated with the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity associated with the object. Property facts are generally used for summary information about an object. A property fact 208, being a special instance of a general fact 204, also includes the same fields (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object associated with Bill Clinton, the value of a property fact may be the text string "Bill Clinton was the 42nd President of the United States from 1993 to 2001." Some objects may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object may have additional special facts aside from name facts and property facts, such as facts conveying a type or category (for example, person, place, movie, actor, organization, etc.) for categorizing the entity associated with the object. In some embodiments, an object's name(s) and/or properties may be represented by special records that have a different format than the general fact records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance set to a negative value). However, the facts of the null object are treated as if they were removed from the repository 115. In some other embodiments, facts of null objects are physically removed from the repository 115.

Figure 2E:
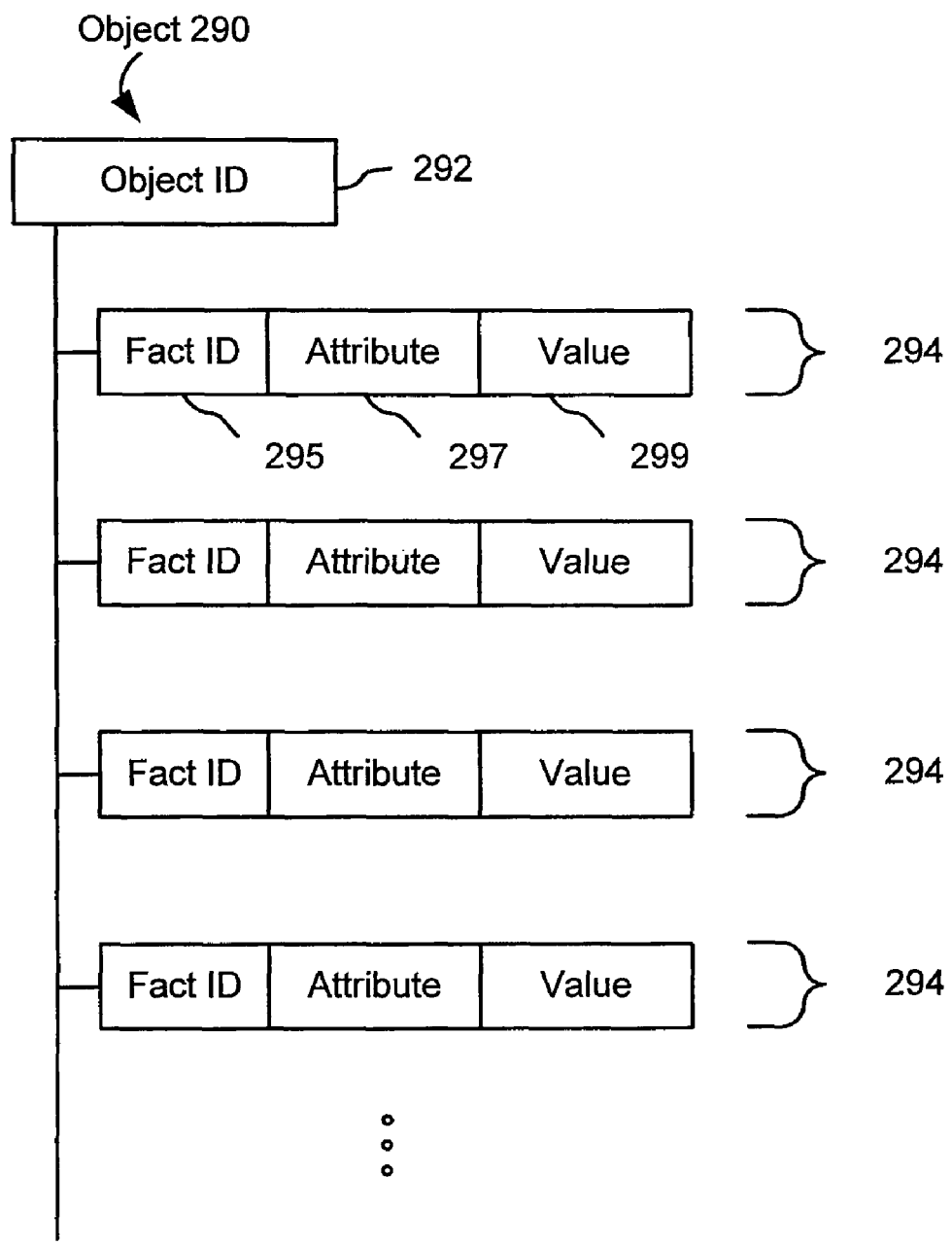
FIG. 2(e) is a block diagram illustrating an alternate data structure for facts and objects in accordance with some embodiments.

FIG. 2(e) is a block diagram illustrating an alternate data structure 290 for facts and objects in accordance with embodiments of the invention. In this data structure, an object 290 contains an object ID 292 and references or points to facts 294. Each fact includes a fact ID 295, an attribute 297, and a value 299. In this embodiment, an object 290 actually exists in memory 107.

As described above, an object may explicitly exist in the repository 115, or it may exist merely as a collection of facts with a common object ID. Reference is made to particular objects for the purposes of illustration; one of skill in the art will recognized that the systems and methods described herein are applicable to a variety of implementations and that such references are not limiting. When reference is made to a fact being associated with an object, it should be understood that in at least one embodiment a fact is associated with an object by sharing a common object ID with other facts. For example, a fact could be associated with an object of a given type by sharing a common object ID at least with a type fact indicating the given type (or as another example, with a category fact indicating a particular category of object). Furthermore, in various embodiments, facts and objects can be stored in a variety of structures, such as fact and/or object repositories. When reference is made herein to the repository 115, it should be understood that various embodiments may store facts and/or objects in a variety of data structures.

Figure 3:
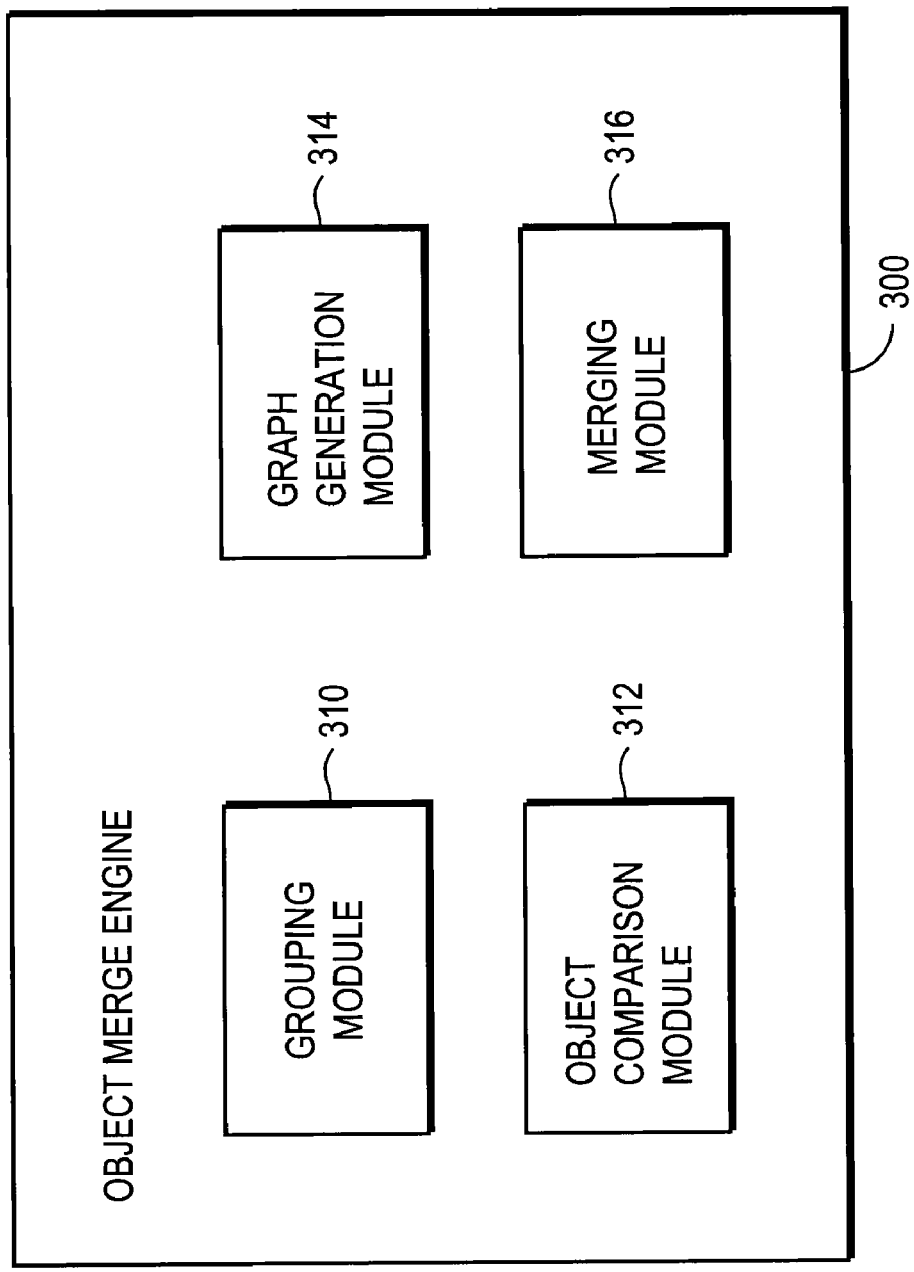
FIG. 3 is a block diagram illustrating an object merge engine according to one embodiment.

FIG. 3 is a block diagram illustrating an object merge engine 300 according to one embodiment. The object merge engine 300 identifies objects in the repository 115 that are associated with the same entity (or concept) and merges those objects. The merged objects are stored in the repository 115 instead of, or in addition to, the objects from which they were formed. The object merge engine 300 thus improves the quality of the facts within the repository 115 by reducing duplicative objects in the repository and increasing the amount of facts contained in a given object. Depending upon the embodiment, the object merge engine 300 can process all objects in the repository 115 or process only a designated set of objects, such as objects having certain name facts, objects added during a certain time interval (e.g., recently added objects), and/or objects meeting other criteria. The designated set of objects are referred to herein as the "merge candidate objects" or "merge candidates."

An embodiment of the object merge engine 300 is implemented as a janitor 110. However, the object merge engine 300 can also be implemented by other entities shown in FIG. 1 and/or by another entity altogether. FIG. 3 illustrates that the object merge engine 300 includes multiple modules for performing various functions. Some embodiments include different and/or additional modules than the ones shown in FIG. 3. Moreover, the functions attributed to the modules herein can be distributed among the modules in different ways.

A grouping module 310 groups the merge candidate objects based on the values of their facts. In one embodiment, all of the merge candidate objects include at least one fact having a same attribute. For example, each object includes a name fact having a "name" attribute and a corresponding value describing the name of the entity with which the object is associated. One embodiment creates a group (or "bucket") for each unique and/or similar value of the fact with the same attribute in the merge candidates. Thus, if the grouping is performed based on the name fact, and there are two merge candidates, one containing the name "George Bush" and the other containing the names "Bill Clinton" and "William Jefferson Clinton," the grouping module 310 creates three groups. An object having multiple name facts is placed in multiple groups. For example, the object containing the names "Bill Clinton" and "William Jefferson Clinton" is placed in the "Bill Clinton" group and in the "William Jefferson Clinton" group. One embodiment of the grouping module 310 accounts for synonyms (e.g., "Bill" and "William") and other minor variations (such as occurrences of middle names, "jr.," "Inc." and other such terms in strings) when forming the groups.

Furthermore, other embodiments of the grouping module 310 group based on facts or aspects other than names. For example, the grouping module 310 can group based on facts such as "date of birth," "height," "weight," and both height and weight. Likewise, the grouping module 310 can group based on the source domain from which the object was extracted. Again, an embodiment of the grouping module 310 accounts for synonyms, equivalencies, and minor variations when forming the groups. For example, objects containing the facts "height: 91 inches" and "height: 2.3 meters" can be grouped together because the heights are very similar even though the facts are not identical. One embodiment groups by height rounded to the nearest five centimeters to accommodate small errors in measurement.

An object comparison module 312 compares the merge candidates within each group. In one embodiment, the object comparison module 312 operates on two objects at a time and compares every pair of objects in the group. The object comparison module 312 computes a similarity value that measures the similarity between the two objects. There are a variety of ways to compute the similarity value. The similarity value computation utilized by one embodiment of the object comparison module 312 is described herein. Other embodiments can use different and/or additional computations.

When comparing a pair of objects within a group, an embodiment of the object comparison module 312 determines whether the objects share any or all of the following features: 1) the entities share at least one type; 2) a term frequency/inverse document frequency (TF/IDF) metric exceeds a specified threshold; 3) the two objects came from the same web page or other electronic document; 4) the web link graph for the objects is greater than zero and less than a specified threshold; or 5) the objects share an uncommon fact. For each feature, the object comparison module 312 assigns a similarity weight between zero and one inclusive indicating whether the objects share the feature, and the extent of the sharing.

Turning now to the individual features, each object has zero or more special "type" facts that describe the type of entity represented by the object. Examples of types include "person," "first baseman," "car," "mountain," and "mathematical concept." An object can have multiple types depending upon the facts present in the document on which the object is based. For example, an object with the name "George Bush" can have a type "person" and a type "ship" if the underlying document describes both President Bush and the aircraft carrier named after him. The object comparison module 312 determines whether the two objects being compared have at least one type fact in common. In one embodiment, the object comparison module 312 computes a similarity weight of zero or one in response to the comparison, with a weight of one indicating that the objects share a common type.

The TF/IDF metric measures the similarity of text contained in the two objects being compared relative to the similarity with text in the overall corpus (e.g., the web at large or the entire set of objects in the repository 115). In other words, the TF/IDF metric measures whether the two objects have more words in common than one would expect given the frequency that the words are used in the relevant domain. The TF/IDF metric is useful because many objects have facts with values that are text strings. For example, two objects about the first President George Bush might each have a fact that contains a lengthy text string describing his biography. The TF/IDF metric comparison would determine that both facts use words like "baseball," "Yale," "Barbara," "President," etc. more often than these words are used by objects, facts, or documents describing other entities. In one embodiment, the object comparison module 312 computes a similarity weight between zero and one inclusive for the TF/IDF metric, where a weight of zero indicates that the facts of the objects have a very low TF/IDF similarity and a weight of one indicates that the facts of the objects have a very high TF/IDF similarity.

If two objects are derived from the same web page or other electronic document, then there is a strong possibility that the objects are associated with the same entity. Accordingly, an embodiment of the object comparison module 312 computes a similarity weight of one if the objects are from the same document, and a weight of zero if the objects are derived from different documents. Similarly, if the objects are not derived from the same web page, an embodiment of the object comparison module 312 determines the web link graph distance between the pages from which the objects are derived. The web link graph distance measures the number of hypertext links one must follow to reach one page from the other. For example, if a first page contains a hypertext link directly to a second page, the web link graph distance between the pages is one. An embodiment of the object comparison module 312 computes a similarity weight of zero if the web link graph distance exceeds a specified threshold, and a weight of one if the web link graph distance is below the threshold. The web link graph distance threshold in one embodiment is two.

If two objects share an uncommon fact, then the objects might be associated with the same entity. For example, if two objects share the fact (height, 8850 Meters), they might both be associated with Mount Everest. Likewise, if two objects of type "person" share the fact (height, 7' 5"), they are likely associated with the same person because this is an unusually tall height. An embodiment of the object comparison module 312 computes a similarity weight of zero if the pair of objects do not share an uncommon fact, and a weight of one if the objects share such a fact.

In one embodiment, the object comparison module 312 uses statistical techniques in order to identify facts that are "uncommon" for purposes of object comparison. The object comparison module 312 computes a normal distribution of values for a fact, and considers values that fall outside of a given range, e.g., two standard deviations from the mean, as "uncommon." For example, the object comparison module 312 can create a histogram of the values of "height" facts from objects of type "person." This histogram will probably show a normal distribution (bell curve) centered at approximately 170 cm (assuming that both genders are included). Heights on the shoulders of the bell curve are "uncommon." In one embodiment, the object comparison module 312 and/or another module analyzes facts in the repository 115 in order to identify common and uncommon values. The facts can be analyzed as part of a preprocessing step, and/or analyzed in real time when two objects are being compared. An administrator or other entity can designated the facts and/or types of facts to be analyzed.

When comparing a pair of objects within a group, an embodiment of the object comparison module 312 also determines whether there is evidence that the objects are not associated with the same entity. In one embodiment, such evidence exists if the objects: 1) have differing singleton attributes; 2) were added by trusted agents; or 3) have type conflicts. These types of evidence are described in more detail below. In one embodiment, the object comparison module 312 applies a negative infinity similarity weight to a pair of objects that contain any evidence that they are not associated with the same entity. This similarity weight ensures that the two objects are not merged.

A singleton attribute can take on only one value for a given entity. For example, the "date of birth" attribute for a person should only have a single value. Similarly, the "number of pages" for a book, "height" of a mountain, "length" of a song, and "chemical formula" for a drug should each have only a single value. If the pair of objects being compared have different singleton attributes, an embodiment of the object comparison module 312 assumes that the objects must be associated with different entities and thus assigns a negative infinity similarity weight to the pair. The singleton attributes can be identified by human users or machine-learned through an analysis of the objects in the repository 115.

Some objects are added by trusted agents. A trusted agent is a tool that is specifically designed to create objects based on facts contained in a specific set of electronic documents known to be mutually unique. For example, an agent can be designed to create objects and/or facts based on the contents of web pages from sites like Wikipedia, the CIA World Factbook, or another web site that enforces this uniqueness. These sites generally do not contain multiple web pages for the same entity. If the two objects under comparison were derived from the same web site and added by the same trusted agent, an embodiment of the object comparison module 312 assumes that the agent properly distinguished among the entities associated with the objects. Accordingly, the object comparison module 312 assigns a negative infinity similarity weight to the pair to ensure that they are not merged even if the objects contain similar facts.

A type conflict exists if a pair of objects have facts indicating that they are of mutually exclusive types. For example, if one object has a type fact indicating that it is associated with a person, and another object has a type fact indicating that it is associated with a ship, then the objects are likely not associated with the same entity. The object comparison module thus assigns a negative infinity similarity weight to the pair to prevent them from being merged.

The object comparison module 312 combines the similarity weights to produce the similarity value and stores this final value in association with the pair of objects. In one embodiment, the object comparison module 312 assigns a similarity value of −0.1 or another small negative value if the object pair shares no features in order to prevent a merger of the objects. In addition, the object comparison module 312 assigns a similarity value of zero to pairs of objects that are in different groups and therefore cannot share features. Thus, the similarity value assigned to a pair of objects in this embodiment is either negative infinity or within the range between −0.1 (no shared features) and five (all features shared to maximum possible extent) inclusive. A positive similarity value indicates that there is evidence for a merge, a negative value indicates that there is evidence against a merge, and a zero value is non-determinative.

A graph generation module 314 creates graphs describing the comparisons performed by the object comparison module 312. In one embodiment, the graph generation module 314 creates graphs linking sets of possibly-related objects across all of the groups. Staying with the name-based group embodiment, recall that an object can have multiple names and therefore can be placed in multiple groups. Since an object is paired with every other object in its group, and the object can also be a member of multiple groups, the relatedness graph for the object can span multiple name-based groups. In one embodiment, the graph generation module 314 creates graphs having nodes representing objects and edges between the nodes representing possible relationships between the objects. The weight of an edge between two nodes is the similarity value for the pair of objects represented by the nodes.

While this description refers to the output of the graph generation module 314 as a "graph," embodiments of the module can generate outputs that are not technically graphs. There are many ways to represent graphs and related data structures within a computer, and embodiments of the graph generation module 314 can use any such technique. For example, an embodiment of the graph generation module 314 can use a table to represent the relationships of the objects. As used herein, the term "graph" is intended to cover other, non-graph-based, representations of the objects.

A merging module 316 analyzes the graphs produced by the graph generation module 314 and merges objects that are likely associated with the same entity. In one embodiment, the merging module 316 establishes a threshold for the similarity value. Pairs of objects having a similarity value above the threshold are considered associated with the same entity and are merged. In one embodiment, the threshold is zero.

In one embodiment, the merging module 316 performs a hierarchical agglomerative clustering on each graph in order to merge nodes and the objects represented by the nodes. For a given graph, the merging module 316 identifies the edge having the greatest similarity value that exceeds the threshold and merges the nodes connected by the edge (and the associated objects). Then, then merging module 316 again finds the greatest similarity value and merges the associated nodes/objects. This merging process continues until either all nodes in the graph are merged or the similarity values between all of the remaining nodes are below the threshold.

In one embodiment, the similarity values between a merged object and other objects in the graph are recomputed upon each merge. Assume there are two objects $O_1$ and $O_2$ that are to be merged, and a third object $O_3$ that is in the same graph. When $O_1$ and $O_2$ are merged, the similarity values between $O_1$ and $O_3$ and between $O_2$ and $O_3$ are summed to produce the similarity value between the $O_1/O_2$ and $O_3$ pair. This summing causes an accelerating effect where $O_3$ is likely to be either a lot more or a lot less similar to $O_1/O_2$ than it was to either $O_1$ or $O_2$ individually.

An embodiment of the merging module 316 merges two or more objects by combining the facts of the objects into a single object. In one embodiment, identical facts contained in both objects are merged into a single fact. Different facts in the objects are retained in the merged object. The merging module 316 stores the merged object in the repository 115 in place of, or in addition to, the objects from which it was formed.

Figure 4:
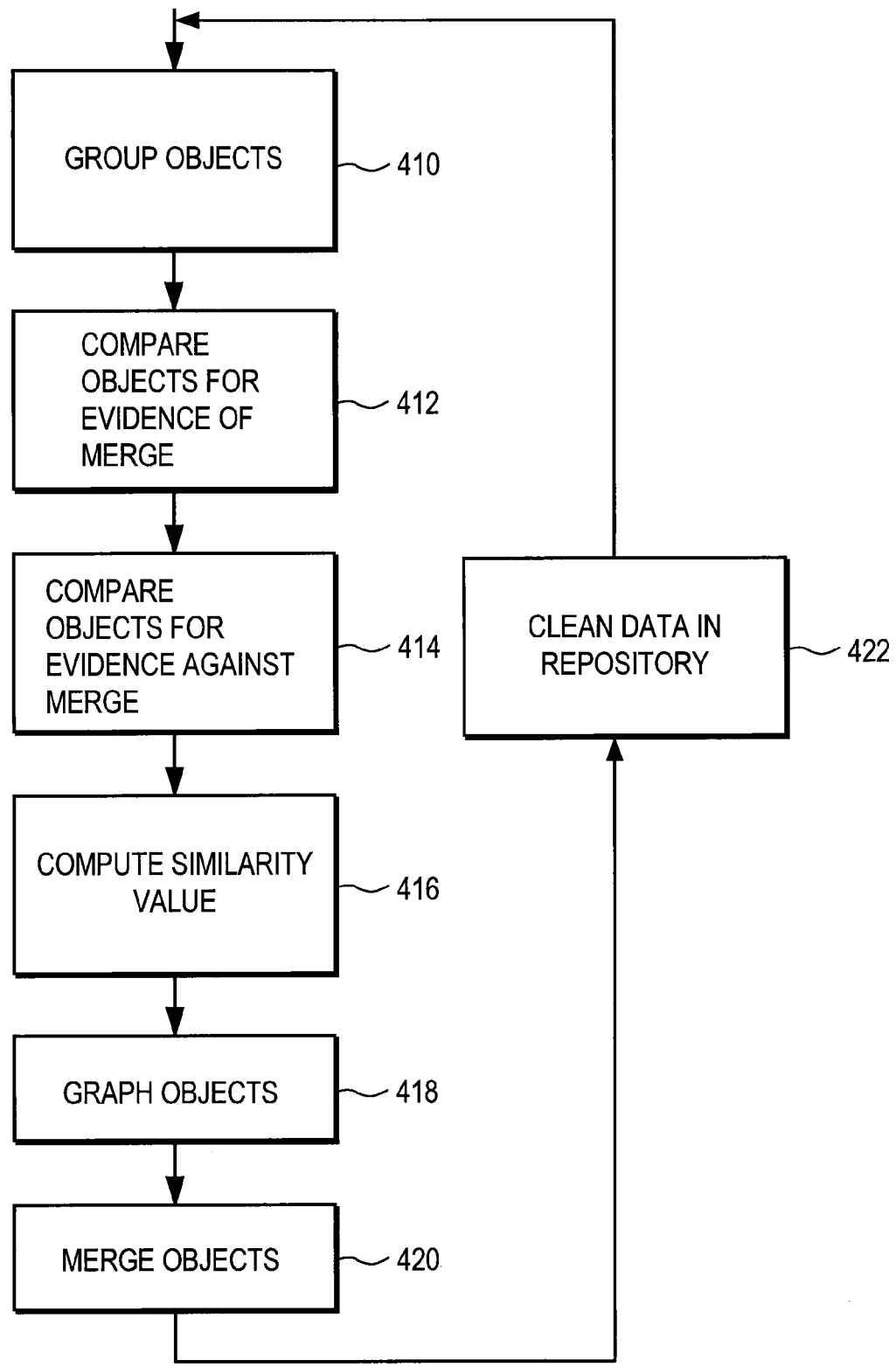
FIG. 4 is a flow chart illustrating steps performed by the object merge engine to merge objects in the repository according to one embodiment.

FIG. 4 is a flow chart illustrating steps performed by the object merge engine 300 to merge objects in the repository 115 according to one embodiment. Other embodiments perform different and/or additional steps than the ones shown in the figure. In addition, other embodiments perform the steps in different orders.

Initially, the object merge engine 300 groups 410 a set of merge candidate objects. The engine 300 compares each pair of objects in each group. For a given pair of objects, the engine 300 compares 412 the objects for evidence in favor of merging them. For example, both objects containing the same uncommon fact can be evidence in favor of merging. In addition, the engine 300 compares 414 the objects for evidence against merging them. For example, both objects being added by the same trusted agent can be evidence against merging them. The object merge engine 300 computes 416 a similarity value for each pair of objects based on the comparisons.

Further, the engine 300 graphs 418 the objects based on their group relationships and similarity values. The engine 300 performs hierarchical agglomerative clustering on the graphs and merges 420 objects that have a similarity value exceeding a threshold. The merged objects are stored in the repository 115.

In one embodiment, janitors 110 associated with the merge engine 300 and/or other entities benefit from the first merging round. These janitors 110 clean 422 the post-merge data in the repository 115 to the point where additional merging is possible in a subsequent round. These optional subsequent rounds are shown in FIG. 4 as an arrow that extends from step 420 through step 422 and returns to step 410. One embodiment performs two rounds of object merging. Other embodiments can perform fewer or more rounds.

To understand the operation of the object merge engine 300 described above, consider an example using the following four merge candidate objects:

Object 1
name: Bill Clinton
type: person
date of birth: 19 Aug. 1946
wife: Hillary Clinton
Object 2
name: William Jefferson Clinton
type: person
place of birth: Hope, Ark.
Object 3
name: Bill Clinton
name: William Jefferson Clinton
type: person
date of birth: Aug. 19, 1946
Object 4
name: Bill Clinton
type: person
date of birth: Mar. 12, 1793.

These objects collectively have two different values for the name fact: "Bill Clinton" and "William Jefferson Clinton." Thus, the object merge engine 300 creates a group for each name and assigns the objects to the groups as follows:

Group "Bill Clinton:" Objects 1, 3, and 4
Group "William Jefferson Clinton": Objects 2 and 3.

The object merge engine 300 compares each pair of objects in a group for evidence in favor of a merge and evidence against a merge, and computes a similarity value based on the evidence. Assume for this example that a pair with only evidence in favor of a merge receives a similarity value of "1" while a pair with evidence against a merge receives a similarity value of "$-\infty$." The similarity values for the pairs in the groups are:

(1, 3): 1
(1, 4): $-\infty$
(3, 4): $-\infty$
(2, 3): 1

Object pairs (1,3) and (2,3) each receive a similarity value of "1" because they share a common type. Pairs (1,4) and (3,4) each receive a similarity value of "$-\infty$" because the attribute "date of birth" is singleton and object four has a date of birth fact with the value of "Mar. 12, 1793." This different singleton attribute constitutes evidence against a merger with objects one or three.

Figure 5B:
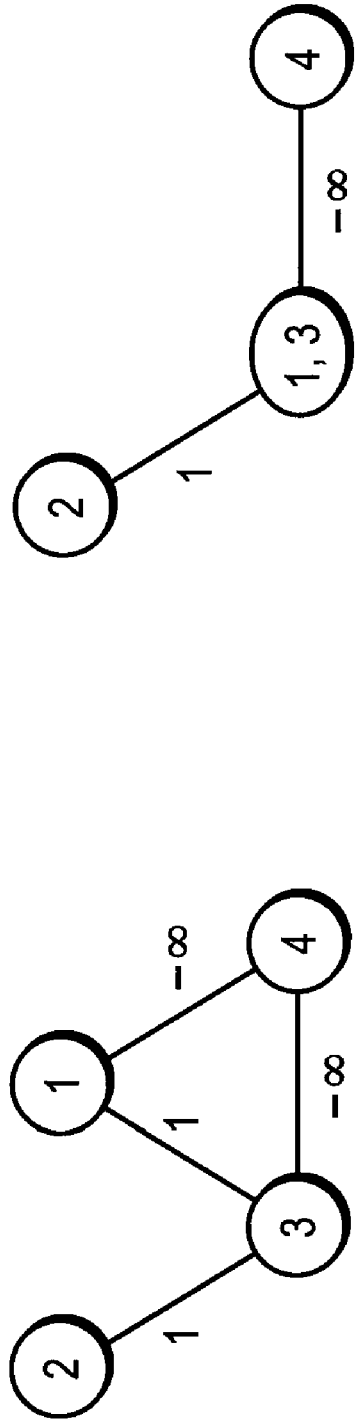
FIG. 5 illustrates examples of graphs produced by the object merge engine for four sample objects.
Figure 5C:
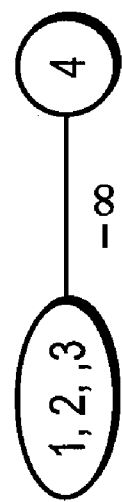
Figure 5A:
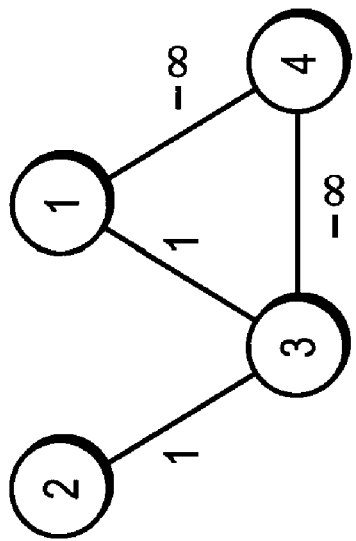

FIG. 5 illustrates examples of graphs produced by the object merge engine 300 for the four sample objects described above. FIG. 5A shows the initial graph before any objects are merged. In FIG. 5A, there are four nodes corresponding to the four objects. Each node is labeled with the number of the object to which it corresponds. Moreover, the edges between the nodes are labeled with the similarity value of the pair of objects represented by the connected nodes. For example, the edge between nodes "2" and "3" is labeled with "1" and the edge between nodes "3" and "4" is labeled with "$-\infty$."

The object merge engine 300 performs hierarchical agglomerative clustering on the graph of FIG. 5A to merge the objects. Assume for purposes of this example that the similarity value merging threshold is one. Thus, object pairs having a similarity value of at least one are merged, while object pairs having lower similarity values are not merged. Assume for this example that the merging starts with nodes corresponding to objects one and three (merging could also have started with another node pair having a similarity value of "1").

FIG. 5B shows the graph after objects one and three are merged. A node corresponding to the merged object, labeled "1, 3," is connected to the node corresponding to object two with an edge having a weight of "1" and to the node corresponding to object four with an edge having a weight of "$-\infty$." In this example, the similarity value between the merged object and object two is one. Accordingly, the object merge engine 300 merges object two into the merged object containing objects 1 and 3. This merger creates a new merged object containing facts from objects one, two, and three. FIG. 5C shows the graph after objects one, two, and three are merged. The node for the merged object (labeled "1, 2, 3") is connected to the node for object four with a weight of $-\infty$. Accordingly, the merge process terminates because this similarity value is below the threshold.

In other embodiments, the object merge engine 300 uses different and/or additional techniques to merge objects. These techniques can be used on their own, or in combination with the techniques described above.

In one such technique, the object comparison module 312 compares each pair of objects in a group to determine whether one object is a subset of the other. A first object is a subset of a second object if all of the facts in the first object are also found in the second object. Once the subset relationships are determined, the graph generation module 314 builds directed graphs describing the subset relationships of all of the objects from all of the groups. A first node representing a first object having an edge directed to a second node representing a second object indicates that the first object is a subset of the second object.

In the directed graph, a node representing an object that is a superset of other objects and not a subset itself will constitute a graph sink. That is, the node will have one or more edges entering the node but no edges leaving the node. If the node representing an object in the graph is connected by directed edges to exactly one sink node, the merging module 316 merges the object into the object represented by the sink node. Further, if the node representing the object in the graph is connected to more than one sink node, then the merging module 316 deletes the object from the repository 115 because it adds no information to the repository and is ambiguous.

In some embodiments, the techniques described herein are performed on entities other than objects. For example, the techniques can be applied directly to web pages or other electronic documents. In such an embodiment, the output is a cluster of web pages of facts.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of merging objects stored in a memory and associated with a same entity, comprising:

identifying a plurality of merge candidate objects, wherein each merge candidate object is created using facts extracted from one or more electronic documents, each fact comprises an attribute and a value, each merge candidate object comprises one or more facts describing an entity with which the object is associated, each merge candidate object includes at least one fact with a same attribute, and each merge candidate object is distinct from the one or more electronic documents and the entity associated with the object;

grouping the plurality of merge candidate objects in accordance with values corresponding to the same attribute in the at least one fact, the grouping including assigning a respective merge candidate object to a respective group of a plurality of groups, the respective group corresponding to the value of the at least one fact with the same attribute in the respective merge candidate object;

identifying similarities between objects in each group, the identifying including computing a similarity value that indicates an amount of similarity between a pair of objects in the group;

generating one or more graphs describing identified similarities among the objects in all of the groups;

analyzing the one or more graphs describing the similarities among the objects to identify two or more objects associated with the same entity;

merging the two or more objects associated with the same entity to produce a merged object that includes facts of the two or more objects associated with the same entity; and storing the merged object in a repository in the memory.

2. The method of claim 1, wherein the merge candidate objects are stored in the repository, and wherein each merge candidate object includes one or more facts extracted from an electronic document stored by a document host on a network.

3. The method of claim 1, wherein the at least one fact having the same attribute includes a name fact having a value including a name of the entity with which the object is associated and wherein grouping the plurality of merge candidate objects comprises:

identifying names in the name facts of the plurality of merge candidate objects;

creating a group for each distinct identified name; and assigning each merge candidate object to a group corresponding to the name in the name fact included in the object, wherein an object including a plurality of distinct names is assigned to a plurality of groups.

4. The method of claim 1, wherein identifying similarities between objects in each group comprises:
- comparing the pair of objects in the group to identify evidence that the objects in the pair are associated with the same entity;
- comparing the pair of objects in the group to identify evidence that the objects in the pair are not associated with the same entity; and
- computing the similarity value responsive to results of the comparisons, the similarity value indicating the amount of similarity between the objects.

5. The method of claim 4, wherein comparing the pair of objects to identify evidence that the objects are associated with the same entity comprises one or more determinations from a group consisting of:
- determining whether both objects of the pair include a same type fact value, a respective type fact value indicating a respective type of a respective associated entity;
- determining whether a term frequency/inverse document frequency (TF/IDF) metric calculated in accordance with text values of facts included in the objects of the pair exceeds a specified TF/IDF threshold;
- determining whether both objects of the pair include facts extracted from a same electronic document stored by a document host on a network;
- determining whether a web link graph distance for electronic documents from which the facts of the objects were extracted is less than a web link graph distance threshold; and
- determining whether both objects of the pair include an uncommon fact.

6. The method of claim 4, wherein comparing the pair of objects to identify evidence that the objects are associated with the same entity comprises:
- identifying an attribute of a fact included in each of the pair of objects and in a plurality of other objects stored in a repository;
- identifying values of the same attribute included in a plurality of objects in the group;
- computing a normal distribution of the identified values for the same attribute, the normal distribution including a mean; and
- determining whether each object in the pair includes a same value for the same attribute, the same value being within a specified distance from the mean of the normal distribution.

7. The method of claim 4, wherein comparing the pair of objects to identify evidence that the objects are not associated with the same entity comprises one or more determinations from a group consisting of:
- determining whether objects of the pair contain different values for a singleton attribute, wherein a singleton attribute can contain only one value for a given entity;
- determining whether both objects of the pair were added to a repository by a same agent; and
- determining whether the objects of the pair contain mutually exclusive type fact values, wherein a respective type fact value represents a respective type of an entity associated with the respective object.

8. The method of claim 1, wherein generating one or more graphs describing the similarities among the objects of all of the groups comprises:
- generating a graph comprising a pair of nodes representing a pair of merge candidate objects and an edge between the pair of nodes, the edge having a weight representing the similarity value for the pair of objects.

9. The method of claim 8, wherein merging the two or more objects associated with the same entity to produce a merged object comprises:
- performing hierarchical agglomerative clustering of the graph.

10. The method of claim 1, wherein identifying similarities comprises:
- comparing a pair of objects in the group to determine whether a first object of the pair includes a subset of facts included in a second object of the pair.

11. The method of claim 10, wherein the first object includes a subset of the facts included in the second object and wherein generating one or more graphs describing the identified similarities among the objects of all of the groups comprises:
- generating a directed graph comprising a pair of nodes representing the pair of objects and a directed edge between the pair of nodes, the direction of the edge indicating that the first object includes a subset of the facts included in the second object.

12. The method of claim 11, wherein the merging comprises:
- analyzing the directed graph to determine whether the node representing the second object is a graph sink and whether the node representing the first object is connected to only one graph sink; and
- responsive to a positive determination that the node representing the second object is a graph sink and the node representing the first object is connected to only one graph sink, merging the first object into the second object.

13. A computer system for merging objects associated with a same entity, the computer system comprising:
- a grouping module for identifying a plurality of merge candidate objects, wherein each merge candidate object is created using facts extracted from one or more electronic documents, each fact comprises an attribute and a value, each merge candidate object comprises one or more facts describing an entity with which the object is associated, each merge candidate object includes at least one fact with a same attribute, and each merge candidate object is distinct from the one or more electronic documents and the entity associated with the object, and for grouping the plurality of merge candidate objects in accordance with values corresponding to the same attribute in the at least one fact, the grouping including assigning a respective merge candidate object to a respective group of a plurality of groups, the respective group corresponding to the value of the at least one fact with the same attribute in the respective merge candidate object;
- an object comparison module for identifying similarities between objects in each group, the identifying including computing a similarity value that indicates an amount of similarity between a pair of objects in the group;
- a graph generation module for generating one or more graphs describing identified similarities among the objects of all of the groups; and
- a merging module for analyzing the one or more graphs describing the similarities among the objects to identify two or more objects associated with the same entity, merging the two or more objects associated with the same entity to produce a merged object that includes facts of the two or more objects associated with the same entity, and storing the merged object in a repository.

14. The computer system of claim 13, wherein the object comparison module is further adapted to:
  compare the pair of objects in the group to identify evidence that the objects in the pair are associated with the same entity;
  compare the pair of objects in the group to identify evidence that the objects in the pair are not associated with the same entity; and
  compute the similarity value responsive to results of the comparisons, the similarity value indicating the amount of similarity between the objects.

15. The computer system of claim 14, wherein comparing the pair of objects to identify evidence that the objects are associated with the same entity comprises one or more determinations from a group consisting of:
  determining whether both objects of the pair include a same type fact value, a respective type fact value indicating a respective type of a respective associated entity;
  determining whether a term frequency/inverse document frequency (TF/IDF) metric calculated in accordance with text values of facts included in the objects of the pair exceeds a specified TF/IDF threshold;
  determining whether both objects of the pair include facts extracted from a same electronic document stored by a document host on a network;
  determining whether a web link graph distance for electronic documents from which the facts of the objects were extracted is less than a web link graph distance threshold; and
  determining whether both objects of the pair include an uncommon fact.

16. The computer system of claim 14, wherein comparing the pair of objects to identify evidence that the objects are not associated with the same entity comprises one or more determinations from a group consisting of:
  determining whether objects of the pair contain different values for a singleton attribute, wherein a singleton attribute can only contain one value for a given entity;
  determining whether both objects of the pair were added to a repository by a same agent; and
  determining whether the objects of the pair contain mutually exclusive type fact values, wherein a respective type fact value represents a respective type of an entity associated with the respective object.

17. The computer system of claim 13, wherein the graph generation module generates a graph comprising a pair of nodes representing a pair of merge candidate objects and an edge between the pair of nodes, the edge having a weight representing the similarity value for the pair of objects.

18. The computer system of claim 17, wherein the merging module is adapted to perform hierarchical agglomerative clustering of the graph.

19. The computer system of claim 13, wherein the object comparison module compares a pair of objects in the group to determine whether a first object of the pair includes a subset of facts included in a second object of the pair.

20. The computer system of claim 19, wherein the first object includes a subset of the facts included in the second object and wherein the graph generation module generates a directed graph comprising a pair of nodes representing the pair of objects and a directed edge between the pair of nodes, the direction of the edge indicating that the first object includes a subset of the facts included in the second object.

21. The computer system of claim 20, wherein the merging module is further adapted to:
  analyze the directed graph to determine whether the node representing the second object is a graph sink and whether the node representing the first object is connected to only one graph sink; and
  responsive to a positive determination that the node representing the second object is a graph sink and the node representing the first object is connected to only one graph sink, merge the first object into the second object.

22. A non-transitory computer-readable storage medium storing one or more instructions for execution by one or more processors, the one or more instructions comprising:
  a grouping module for identifying a plurality of merge candidate objects, wherein each merge candidate object is created using facts extracted from one or more electronic documents, each fact comprises an attribute and a value, each merge candidate object comprises one or more facts describing an entity with which the object is associated, each merge candidate object includes at least one fact with a same attribute, and each merge candidate object is distinct from the one or more electronic documents and the entity associated with the object, and for grouping the plurality of merge candidate objects in accordance with values corresponding to the same attribute in the at least one fact, the grouping including assigning a respective merge candidate object to a respective group of a plurality of groups, the respective group corresponding to the value of the at least one fact with the same attribute in the respective merge candidate object;
  an object comparison module for identifying similarities between objects in each group, the identifying including computing a similarity value that indicates an amount of similarity between a pair of objects in the group;
  a graph generation module for generating one or more graphs describing identified similarities among the objects in all of the groups; and
  a merging module for analyzing the one or more graphs describing the similarities among the objects to identify two or more objects associated with the same entity, merging the two or more objects associated with the same entity to produce a merged object that includes facts of the two or more objects associated with the same entity, and storing the merged object in a repository.

23. The computer readable storage medium of claim 22, wherein the object comparison module is further adapted to:
  compare the pair of objects in the group to identify evidence that the objects in the pair are associated with the same entity;
  compare the pair of objects in the group to identify evidence that the objects in the pair are not associated with the same entity; and
  compute the similarity value responsive to results of the comparisons, the similarity value indicating the amount of similarity between the objects.

24. The computer readable storage medium of claim 23, wherein comparing the pair of objects to identify evidence that the objects are associated with the same entity comprises one or more determinations from a group consisting of:
  determining whether both objects of the pair include a same type fact value, a respective type fact value indicating a respective type of a respective associated entity;
  determining whether a term frequency/inverse document frequency (TF/IDF) metric calculated in accordance with text values of facts included in the objects of the pair exceeds a specified TF/IDF threshold;
  determining whether both objects of the pair include facts extracted from a same electronic document stored by a document host on a network;

determining whether a web link graph distance for electronic documents from which the facts of the objects were extracted is less than a web link graph distance threshold; and determining whether both objects of the pair include an uncommon fact.

25. The computer readable storage medium of claim 23, wherein comparing the pair of objects to identify evidence that the objects are not associated with the same entity comprises one or more determinations from a group consisting of:

determining whether objects of the pair contain different values for a singleton attribute, wherein a singleton attribute can only contain one value for a given entity;

determining whether both objects of the pair were added to a repository by a same agent; and determining whether the objects of the pair contain mutually exclusive type fact values, wherein a respective type fact value represents a respective type of an entity associated with the respective object.

26. The computer readable storage medium of claim 22, wherein the graph generation module generates a graph comprising a pair of nodes representing a pair of merge candidate objects and an edge between the pair of nodes, the edge having a weight representing the similarity value for the pair of objects.

27. The computer readable storage medium of claim 26, wherein the merging module is adapted to perform hierarchical agglomerative clustering of the graph.

28. The computer readable storage medium of claim 22, wherein the object comparison module compares a pair of objects in the group to determine whether a first object of the pair includes a subset of facts included in a second object of the pair.

29. The computer readable storage medium of claim 28, wherein the first object includes a subset of the facts included in the second object and wherein the graph generation module generates a directed graph comprising a pair of nodes representing the pair of objects and a directed edge between the pair of nodes, the direction of the edge indicating that the first object includes a subset of the facts included in the second object.

30. The computer readable storage medium of claim 29, wherein the merging module is further adapted to:

analyze the directed graph to determine whether the node representing the second object is a graph sink and whether the node representing the first object is connected to only one graph sink; and responsive to a positive determination that the node representing the second object is a graph sink and the node representing the first object is connected to only one graph sink, merge the first object into the second object.

* * * * *